Aug. 30, 1932.  K. R. HERMAN  1,874,526
BRAKE OPERATING MECHANISM FOR DELIVERY VEHICLES
Filed April 22, 1929  3 Sheets-Sheet 1
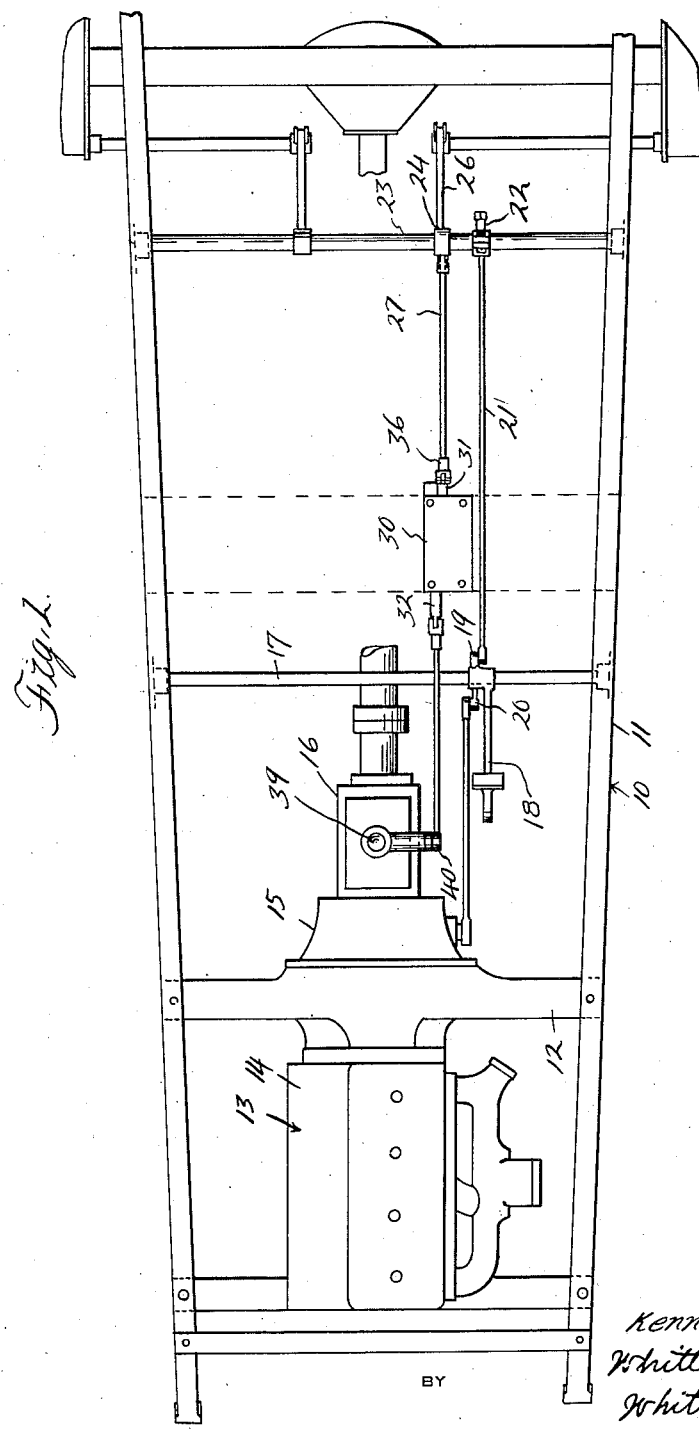
INVENTOR
Kenneth R. Herman
Whittemore Hulbert
Whittemore Belknap
BY
ATTORNEYS Aug. 30, 1932.     K. R. HERMAN     1,874,526
BRAKE OPERATING MECHANISM FOR DELIVERY VEHICLES
Filed April 22, 1929     3 Sheets-Sheet 2
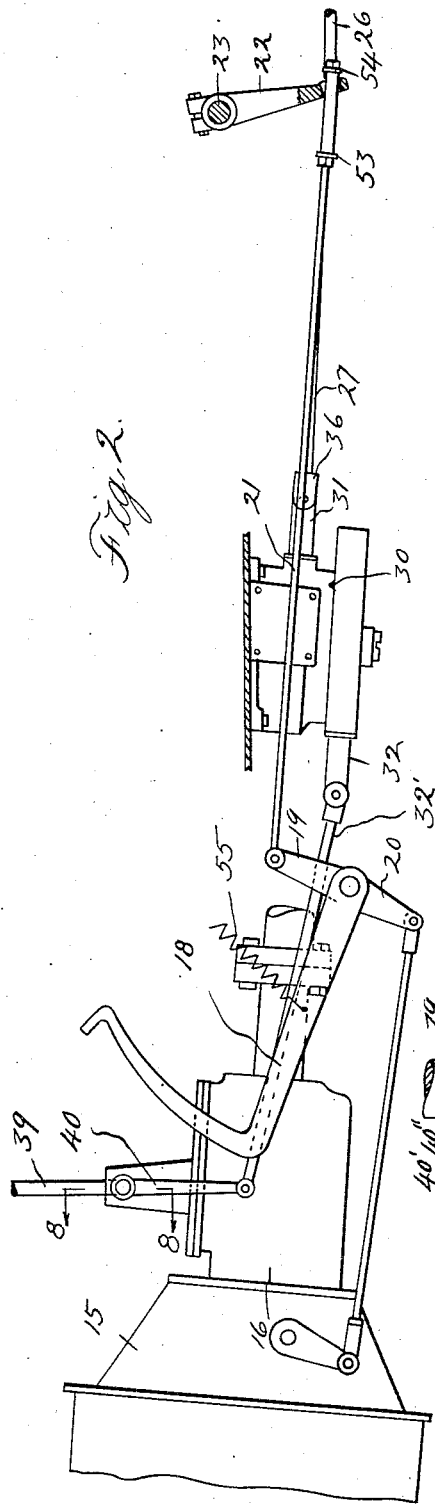
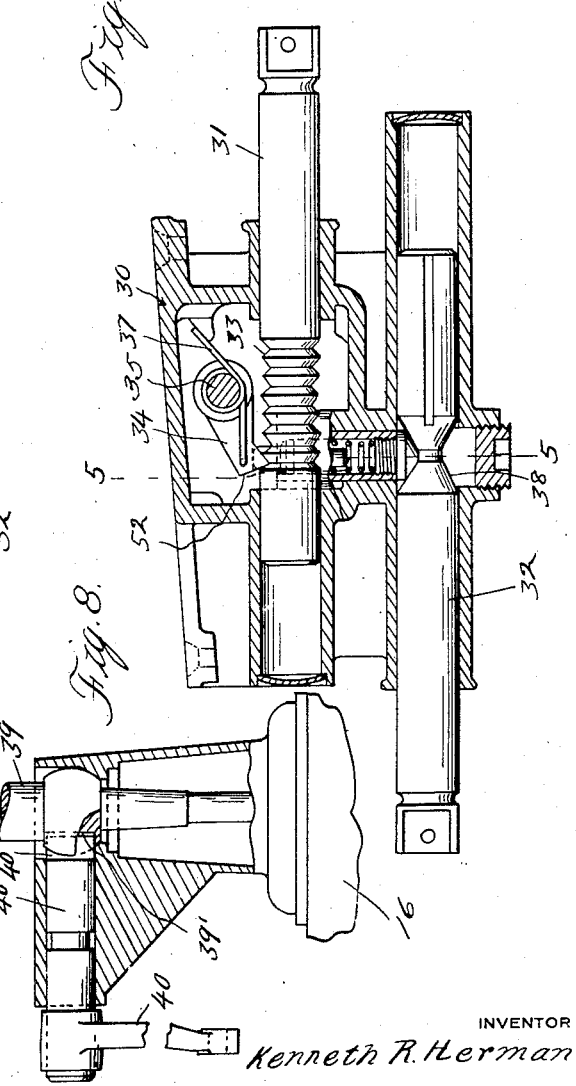
INVENTOR
Kenneth R. Herman
BY Whittemore Hulbert
Whittemore & Belknap
ATTORNEYS Aug. 30, 1932. K. R. HERMAN 1,874,526
BRAKE OPERATING MECHANISM FOR DELIVERY VEHICLES
Filed April 22, 1929 3 Sheets-Sheet 3
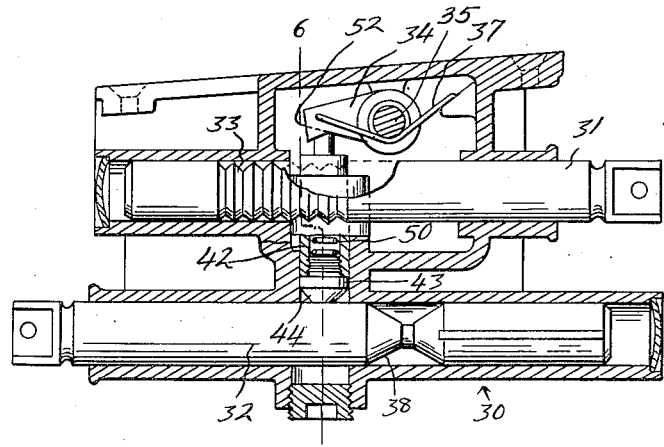
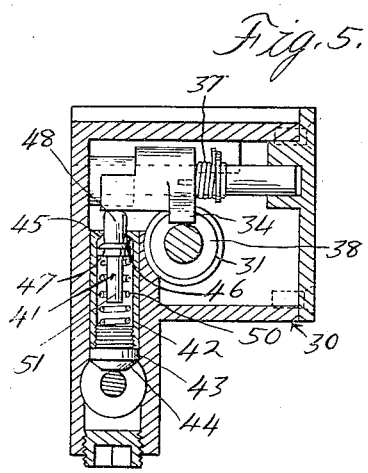
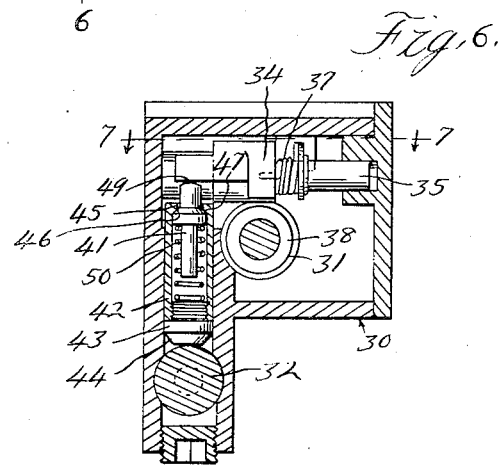
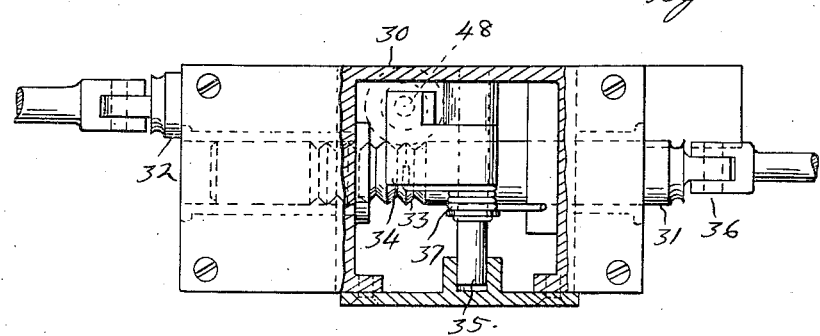
INVENTOR
Kenneth R. Herman
BY Whittemore Hulbert
Whittemore & Belknap
ATTORNEYS Patented Aug. 30, 1932

1,874,526

UNITED STATES PATENT OFFICE

KENNETH R. HERMAN, OF DETROIT, MICHIGAN, ASSIGNOR, BY MESNE ASSIGNMENTS, TO CONTINENTAL-DIVCO COMPANY, OF DETROIT, MICHIGAN, A CORPORATION OF MICHIGAN

BRAKE OPERATING MECHANISM FOR DELIVERY VEHICLES

Application filed April 22, 1929. Serial No. 357,223.

The invention relates to control mechanism for motor vehicles and finds particular utility for use in connection with delivery cars and the like where the controls are more or less exposed and where the driver finds it necessary to leave the vehicle at frequent intervals to make the necessary deliveries. With such a condition there is always danger of someone tampering with the controls as for instance, releasing the brake when the vehicle is parked on a grade.

It is therefore one of the primary objects of this invention to provide mechanism which permits of easily applying and locking the brake but which requires the manipulation of another control member before the brake can be released.

A further object of this invention is to provide control mechanism of the foregoing character which is relatively simple in construction and which may be inexpensively manufactured, assembled and installed.

With the foregoing as well as other objects in view, the invention resides in the peculiar construction and arrangement of parts to be more fully hereinafter described.

In the drawings:

Figure 1 is a diagrammatic fragmentary plan view of a vehicle to which my improved control mechanism is applied;

Figure 2 is a fragmentary side elevation of the construction shown in Figure 1;

Figure 3 is an enlarged sectional view showing the brake locking mechanism;

Figure 4 is a view similar to Figure 3 showing the parts in another position;

Figure 5 is a sectional view taken on the line 5—5 of Figure 3;

Figure 6 is a sectional view taken on the line 6—6 of Figure 4;

Figure 7 is a sectional view taken on the line 7—7 of Figure 6.

Figure 8 is a sectional view taken on the line 8—8 of Figure 2.

Referring now to the drawings, it will be noted that there is fragmentarily illustrated in Figures 1 and 2, a vehicle frame 10 having side sills 11 secured in proper spaced relation to each other by means of the cross rails 12. Secured to the frame member 10 adjacent the forward end thereof in the customary manner, is a suitable power unit 13 comprising the motor 14, clutch housing 15 and transmission 16. All of the foregoing units are of conventional design and as a consequence are not illustrated herein in detail.

Projecting inwardly from one of the sill members 11 is a suitable rock shaft 17 upon which a control element 18 is journalled. The element 18 is located in a convenient place within the driver's compartment and is provided at the rear end thereof with oppositely extending levers 19 and 20. The end of the lever 20 is suitably connected to a clutch arranged within the housing 15 while the end of the lever 19 is connected by means of the rod 21 and rock arm 22 to the brake rock shaft 23, the latter preferably extends transversely of the vehicle and is journalled in suitable bearings carried by the sill members 11. Thus from the foregoing it will be apparent that the control element 18 is utilized to actuate both the clutch and brake rock shaft 23.

Secured to the rock shaft 23 adjacent the lever 22, is a second lever 24 connected at the lower end thereof to a pair of oppositely extending rods 26 and 27. The rearwardly extending rod 26 is preferably connected in the conventional manner to the brakes of the vehicle while the forwardly extending rod 27 is suitably connected to the brake locking mechanism to be more fully hereinafter described.

The locking mechanism comprises the housing 30 secured forwardly of the rock shaft 23 to the sill members 11. Reciprocably mounted within aligned bearings formed in the housing 30 and arranged in parallel spaced relation to each other are a pair of shafts 31 and 32. The shaft 31 is provided intermediate the ends thereof with a series of ratchet teeth 33 engageable by a ratchet dog 34 which is pivotally mounted upon a shaft 35 extending transversely of the housing and journalled in the side walls thereof above the shaft 31. The dog 34 is normally yieldably urged into engagement with the ratchet by means of a torsional spring 37 having one end engageable with the dog and the opposite end engageable with the housing. Movement of the shaft 31 is effected by means of a coupling 36 establishing a connection between the rear end of the shaft 31 and the rod 27 extending from the rock arm 24.

The shaft 32 on the other hand, is provided intermediate the ends thereof with a substantially V-shaped groove 38 and is connected at its forward end to the gear shift lever 39 which in turn is connected to the sliding gears (not shown) in the transmission housing for shifting the same.

The connection between the shaft 32 and gear shift lever comprises a link 32' having one end connected to the shaft 32 and the opposite end connected to a lever 40 which in turn is secured to a rock shaft 40'. The latter, as clearly shown in Figure 8, is journaled in an extension of the gear shift lever housing and is provided with a projection 40" engageable in an elongated slot 39' formed in the gear shift lever. The arrangement is such a rocking movement of the gear shift lever to actuate the gears will also effect a rocking of the shaft 40' and owing to the lever and link connection hereinbefore set forth between the shaft 40' and reciprocable shaft 32, the latter will be moved longitudinally of the housing 30.

Slidably mounted within the housing 30 is a dog actuating unit 41 comprising a tubular member 42 closed at the lower end by a plug 43 having a cammed portion 44 adapted to engage within the V-shaped groove 38. The upper end of the tubular member 42 is provided with a restricted opening 45 forming a seat 46 adapted to engage a correspondingly shaped seat portion 47 upon the dog release plunger 48 intermediate the ends thereof. The upper end or dog engaging portion 49 of the plunger is of substantially the same diameter as the restricted opening aforesaid and is adapted to project through the latter as shown in Figure 6 and engage the free end of the pivotal ratchet engaging dog 34. The plunger 48 is normally yieldably maintained into engagement with the free edge of the dog by means of a coil spring 50 disposed within the tubular member 42 and having one end engaging the adjustable block 43 and the opposite end surrounding the lower portion 51 of the plunger and engaging the seat portion 47 on the latter tending to urge the same into engagement with the seat portion 46 on the tubular member and thereby disengage the dog from the ratchet. Release of the dog from the ratchet by the spring 50 is normally prevented however, owing to the fact that the force exerted upon the dog by the torsional spring 37 tending to maintain the same in engagement with the ratchet, is considerably greater than the force exerted by the spring 50 tending to release the dog.

Moreover the construction is such that even when the spring 50 is compressed by moving the shaft 32 forwardly or rearwardly it will still be insufficient to release the dog. This is by virtue of the fact that the torsional spring is assisted in its function to maintain the dog in engagement with the ratchet by a lateral force exerted upon the inclined face 52 of the dog. This lateral force is produced by the brakes, as the latter in their effort to move to released position, exert rearward pull upon the shaft 31 and in so doing exert a lateral force upon the free end of the dog which combines with the force exerted by the torsional spring to maintain the dog into engagement with the ratchet. It will be noted therefore that before the brakes can be released, the lateral force aforesaid must be relieved. This is accomplished in the present instance by actuating the control element 18 to move the shaft 31 slightly forwardly. When the parts are in this position the ratchet engaging portion of the dog will be free to swing out of engagement with the ratchet teeth under action of the spring 50. With the above arrangement, it will be apparent that in order to release the brakes from applied position, it is necessary to not only manipulate the gear shifting control element, but also the combined clutch and brake actuating element.

In order to permit the clutch to return to normal position, after the brakes have been applied and locked in braked position, a lost motion connection is provided between the rear end of the rod 21 and the lower end of the lever 22. This is accomplished by extending the rear end of the rod 21 through a suitable aperture formed in the free end of the lever 22 and providing a pair of longitudinally spaced stops 53 and 54 upon the rod on opposite sides of the lever 22, the arrangement being such that when the brakes are in locked position and the pressure is relieved upon the control element 18, the same will be permitted to move to its original normal position as shown in Figure 2. Moreover, it will be noted that in the normal position of the parts shown in the aforesaid figure, the stop 54 is positioned slightly rearwardly of the free end of the lever 22 so that upon initially depressing the control element 18, the clutch will be disengaged prior to the rocking of the shaft 23 and as a consequence prior to the application of the brakes. A suitable coil spring 55 is provided for returning the control element 18 to its normal position. The foregoing construction is especially desirous in a vehicle wherein a single control element is utilized for actuating both the clutch and the brake, due to the fact that the lost motion connection heretofore set forth, permits the control element to be actuated in a sense independently of the locking means with the result that the clutch is not necessarily maintained in disengaged position during the time the brakes are locked in applied position.

With the construction just described, whenever the combined brake and clutch actuating control element 18 is depressed, it will first actuate the clutch in the manner heretofore described and subsequently rock the shaft 23 through the medium of the rock arm. This rocking of the shaft 23 will effect a corresponding rocking movement of the rock arm 22 which exerts a forward pull upon the rod 26 to apply the brakes and also, through the rod 27, moves the ratchet shaft 31 forwardly while the dog 34 successively engages the ratchet teeth and locks the parts from return movement. The ratchet will hold the brakes in applied position and it will be impossible to release the brakes by any manipulation of the control element 18 alone. Before setting the brake it is usual to throw the transmission into neutral position and in such neutral position the groove 38 is in the position shown in Figure 2 with the plug 43 in engagement therewith and the plunger 48 in engagement with the free end of the dog. Before desiring to release the brake the operator usually starts his engine or if the engine is running releases the clutch and shifts the transmission into low gear. Such shifting of the transmission necessitates rocking the control lever 39 which in addition to shifting the gears, moves the shaft 32 forwardly or rearwardly, depending upon the particular position of the low gear within the transmission. Movement of the shaft 32 from the position illustrated in Figure 2 effects an upward movement of the tubular member 42 and compresses the coil spring 50 against the plunger 48 which in turn tends to rock the dog out of engagement with the ratchet bar. Such rocking is however, temporarily prevented due to the lateral pressure exerted upon the dog by the ratchet teeth in their effort to move in a direction to release the brakes so that before the dog can be released from the ratchet shaft, the latter must be moved forwardly a slight distance. When the shaft assumes this latter position wherein the lateral pressure upon the dog is relieved, the plunger will immediately rock the dog out of engagement with the ratchet teeth and permit the shaft 31, brake rocker shaft 23, and brakes to move to their normal positions.

While in describing the present invention, particular stress has been placed upon the association of the locking means with a vehicle having a single control element for actuating both the clutch and the brake and while I have described the releasing mechanism for the brake as actuated through the gear shift lever, it is to be noted that the particular releasing mechanism may be applied to vehicles having both clutch and brake operating levers and wherein the releasing operation is effected by any control member usually independent of the brake. However, the gear shift lever is particularly adapted for this purpose due to the fact that it is seldom desired to leave the engine in gear when the brakes are applied. Moreover with delivery cars it is often desirable to leave the engine running which necessitates the shifting of the gears to neutral before the brakes are locked. In this connection it will also be noted that with the particular construction described herein, the brakes will not always lock upon actuating the control lever 18 but will only lock when the transmission control element is in neutral position as shown in Figure 2. This is by reason of the fact that the dog is held out of engagement with the ratchet teeth by the plunger when the vehicle is in motion or when the gear shift lever is in any other position but neutral. This arrangement renders it possible to slow down the vehicle without effecting the operation of the locking means.

What I claim as my invention is:

1. In a vehicle control mechanism, the combination with a brake and a control element movable in one direction to apply said brake, of means for locking said brake in applied position while permitting said control element to return to its normal position, a second control element and means for releasing said locking means requiring for its operation the manipulation of both said control elements.

2. In a vehicle control mechanism, the combination with a combined clutch and brake control element, of locking means for the brake incapable of direct release, and means operable upon the manipulation of another control for releasing said locking means.

3. In a vehicle control mechanism, the combination with a combined clutch and brake control element movable in one direction to actuate both said clutch and brake, of means for locking the brake in applied position, a transmission control element and releasing means for said locking means requiring for its operation, the manipulation of said transmission control element.

4. In a vehicle control mechanism, the combination with a single control element for actuating both the clutch and brake, of means for locking the brake in applied position, a second control element, and releasing means for the locking means requiring for its operation the manipulation of both of said control elements.

5. In a vehicle control mechanism, the combination with a clutch and brake control member movable in one direction to apply the brake and disengage the clutch, of means for locking the brake in applied position incapable of direct release, and means permitting the clutch to return to its normal position irrespective of the position of said locking means.

6. In a vehicle control mechanism, the combination with a single control element for actuating both the brake and clutch, of means for locking the brake in applied position, a transmission control element and releasing means for said locking means requiring for its operation the manipulation of both said control elements.

7. In a vehicle control mechanism, the combination with a single control element for actuating both the clutch and brake, of means for locking the brake in applied position while permitting the clutch to return to its normal position, said means including a ratchet operatively connected to the control element and a dog engageable with the ratchet, and means operable upon the manipulation of another control for exerting a releasing force upon the dog insufficient to actually release the same from the ratchet until operation of said first mentioned control element.

8. In a vehicle control mechanism, the combination with a single control element for actuating both the clutch and brake, of means for locking the brake in applied position while permitting the clutch to return to its normal position, said locking means including, a rack bar operatively connected to said control element, a dog engageable with the rack bar, means engageable with the dog tending to release the same from the rack bar, a member movable relative to the rack bar and operable upon the manipulation of another control element to increase the force exerted by the means aforesaid tending to release the dog.

In testimony whereof I affix my signature.

KENNETH R. HERMAN.